Patented Feb. 5, 1946

2,394,522

UNITED STATES PATENT OFFICE 2,394,522

FOUNDRY CORE BINDER

Henry A. Pace, Akron, Ohio, assignor to Wingfoot Corporation, Akron, Ohio, a corporation of Delaware No Drawing. Application January 4, 1944, Serial No. 516,973

3 Claims. (Cl. 22—188)

This invention relates to a foundry core binder and a foundry core, the sand or other particles of which are bound together by the new binder. The binder is a mixture of chlorinated rubber and chlorinated paraffin. It is designed particularly as a binder for cores for castings of aluminum, magnesium, and their alloys.

For the chlorinated rubber, one may employ chlorinated natural rubber, such as chlorinated Hevea rubber or chlorinated guayule rubber or the like. The chlorine content will preferably run in the neighborhood of 70 per cent of the weight of the rubber. Soluble chlorinated synthetics may, likewise, be used, such as a soluble chlorinated copolymer of butadiene and styrene of the type known as GR-S.

The chlorinated paraffin used is one which will give a firm coating with the chlorinated rubber and, ordinarily, contains about 70 per cent of chlorine per 100 parts of paraffin. As much as 9 parts of the chlorinated paraffin may be used with 1 part of chlorinated rubber, or the amount of chlorinated rubber may be increased to 1 part in 4 or even more. With the present scarcity of rubber, one will not ordinarily employ more chlorinated rubber than this. However, up to equal parts of chlorinated rubber and chlorinated paraffin may be used. Any suitable solvent may be employed for bringing the materials into solution. The hydrogenated naphtha which contains a small amount of toluene and is known as Solvesso No. 1 has proved satisfactory. The exact composition of the solvent is unimportant, except that it should be cheap, non-toxic, and should be of relatively low boiling point. The following compositions have proved satisfactory:

Formula 1

| | Parts |
|---|---|
| 20 centipoise chlorinated rubber | 81 |
| Chlorinated paraffin (70% chlorine content) | 324 |
| Solvesso No. 1 | 2960 |

The sediment which settles on bringing chlorinated paraffin into solution may be removed or allowed to remain in the solution without any noticeable effect on the desirability of the material as an adhesive.

Formula 2

| | Parts |
|---|---|
| 20 centipoise chlorinated rubber | 41 |
| Chlorinated paraffin (70% chlorine content) | 365 |
| Solvesso No. 1 | 2960 |

Formula 3

| | Parts |
|---|---|
| Chlorinated guayule rubber | 81 |
| Chlorinated paraffin (70% chlorine content) | 324 |
| Solvesso No. 1 | 2960 |

It will be noted that the solids content of each example is 12 per cent. This proved highly satisfactory although some variation is permissible. Sixty sand molds were sprayed with each of the above compositions in actual foundry tests, and in each case 100 per cent of the treated molds were found satisfactory.

What I claim is:

1. A foundry core binder which consists of a mixture of 1 to 5 parts of chlorinated rubber and 9 to 5 parts of chlorinated paraffin of about 70 per cent chlorine content dissolved in a mutual solvent, the solids content of the solution being in the neighborhood of 12 per cent.

2. A foundry core, the particles of which are bound together by a binder composed of 1 to 5 parts of chlorinated rubber and 9 to 5 parts of chlorinated paraffin with a chlorine content in the neighborhood of 70 per cent.

3. A foundry core, the surface of which is coated with a binder compound of 1 to 5 parts of chlorinated rubber and 9 to 5 parts of chlorinated paraffin with a chlorine content in the neighborhood of 70 per cent.

HENRY A. PACE.